Patented July 19, 1938

2,124,336

UNITED STATES PATENT OFFICE 2,124,336

ARYLIDES OF HYDROXY-ORTHO-CAR-BOXY-BENZOACRIDONES

Max Lange, Frankfort-on-the-Main, and Theodor Jacobs, Wiesbaden, Germany, assignors to General Aniline Works, Inc., New York, N. Y., a corporation of Delaware No Drawing. Application March 4, 1937, Serial No. 129,102. In Germany March 4, 1936

4 Claims. (Cl. 260—37)

The present invention relates to arylides of hydroxy - ortho - carboxy - benzoacridones; more particularly it relates to compounds of the following general formula:

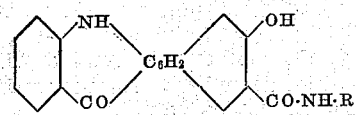

wherein R stands for a member of the group consisting of radicals of the benzene and naphthalene series not containing a member of the group consisting of sulfonic acid and carboxylic acid groups.

We have found that arylides of hydroxy-orthocarboxybenzoacridones may be obtained by condensing in known manner a hydroxy-ortho-carboxybenzoacridone with a primary arylamine which does not contain a sulfonic acid or carboxylic acid group.

The arylides thus obtained are distinguished by an especially high substantivity for the vegetable fiber, which property is of particular practical importance for dyeing by means of an apparatus, and they are valuable intermediates for the manufacture of azo-dyestuffs.

The hydroxy - ortho - carboxybenzoacridones used as parent materials are obtainable by heating an ortho-carboxyphenylamino-2-hydroxynaphthalene-3-carboxylic acid with concentrated sulfuric acid to temperatures situated between about 80° C. and about 130° C.

The following examples serve to illustrate the invention, but they are not intended to limit it thereto:

1. 30 grams of 4'-hydroxy-5'-carboxy-1.2-benzo acridone of the probable formula:

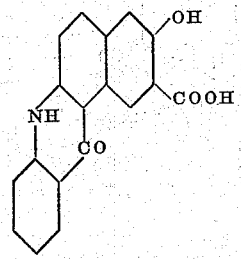

(obtainable, for instance, by heating 6-(2'-carboxyphenylamino) - 2 - hydroxynaphthalene - 3-carboxylic acid with concentrated sulfuric acid) are ground with 300 cc. of aniline for 12 hours in a ball mill to a fine paste which is then introduced into a vessel capable of being heated and provided with a stirrer. At 60° C. to 70° C., 6 grams of phosphorus trichloride are introduced drop by drop into the mixture, which is then gradually heated to 100° C.; thereupon a further quantity of 3 grams of phosphorus trichloride is added. The temperature is maintained for 5 hours at 130° C. After cooling, 3 liters of water are added to the mass and such a quantity of sodium carbonate solution as is necessary to obtain an alkaline reaction. The aniline is steam-distilled, the yellow product is filtered with suction and washed, first with water, then with alcohol and with ether. For further purification the compound is dissolved at about 40° C. in 2N-caustic soda solution and 20 cc. of acetone, the solution is filtered and the product is again precipitated from the filtrate by passing in carbon dioxide until the solution no longer shows a reaction to phenolphthalein; the whole is filtered and the solid matter is washed with water. The anilide of 4' - hydroxy - 5' - carboxy - 1.2-benzoacridone is obtained in an entirely pure form by recrystallization from glacial acetic acid or aqueous pyridine.

The new compound is sparingly soluble in most of the organic solvents and easily soluble in pyridine. Examined with the microscope, it shows fine yellow needles and melts at 334° C. The compound has a very high affinity for cotton fiber.

2. The anilide of 4'-hydroxy-5'-carboxy-1.2-benzoacridone described in Example 1 may also be obtained in the following manner: 25 grams of 4'-hydroxy-5'-carboxy-1.2-benzoacridone are heated for 5 hours at 170° C. with 400 cc. of aniline. Thereupon 20 grams of phosphorus pentoxide are gradually added and the whole is stirred for 24 hours at 170° C. to 180° C. After cooling to 100° C., the mixture is stirred with 300 cc. of xylene. After cooling, the mixture is filtered with suction and the solid matter is washed with alcohol and with ether. As indicated in Example 1, the residue is freed from any residual aniline by steam distillation and addition of a sodium carbonate solution, and is further worked up. The product obtained is identical with the compound obtainable as described in Example 1.

3. 33 grams of the sodium salt of 4'-hydroxy-5'-carboxy-1.2-benzoacridone are ground with 100 cc. of chlorobenzene for 24 hours in the ball mill and the whole is then introduced into a vessel having a stirrer by rinsing with 400 cc. of chlorobenzene. 20 grams of paraanisidine are added. At 60°-70° C. 7 grams of phosphorus trichloride are run in. The whole is then gradually heated to 135° C. and this temperature is maintained for 3-4 hours. After this time, the mixture is cooled to 70° C., a further 6 grams of phosphorus trichloride are added and the whole is further heated for 5-6 hours at 135° C. After cooling, the product is further treated and purified as indicated in Example 1. The para-anisidide of 4'-hydroxy-5'-carboxy-1.2-benzoacridone thus obtained is a body similar to the anilide; it melts at 312° C.

4. The ortho-anisidide of 4'-hydroxy-5'-carboxy-1.2-benzoacridone is obtained in manner analogous to that described in Example 3. The compound has properties similar to those of the anilide and para-anisidide; it melts at 299° C.

5. 30 grams of 4'-hydroxy-5'-carboxy-1.2-benzoacridone are ground with 100 cc. of ortho-nitranisole for 12 hours in the ball mill and the whole is introduced into a vessel having a stirrer by rinsing with 100 cc. of orthonitranisole. 30 grams of 1-amino-2-methyl-4-methoxybenzene are added. At 60°-70° C. 8 grams of phosphorus trichloride are then introduced drop by drop, the whole is heated to 130° C., cooled after 4 hours to 100° C., a further quantity of 5 grams of phosphorus trichloride are added and the temperature maintained at 130° C. for 6 hours. After cooling water is added to the mass; at boiling temperature the whole is rendered feebly acid to Congo paper by means of dilute hydrochloric acid, the ortho-nitranisole is steam-distilled and the precipitate is filtered with suction and washed. The product is worked up as indicated in the preceding examples. The 2-methyl-4-methoxyanilide of 4'-hydroxy-5'-carboxy-1.2-benzoacridone thus obtained has properties similar to those of the arylides already mentioned and melts at 315° C.

6. 16 grams of the sodium salt of 4'-hydroxy-5'-carboxy-3.4-benzoacridone of the constitution:

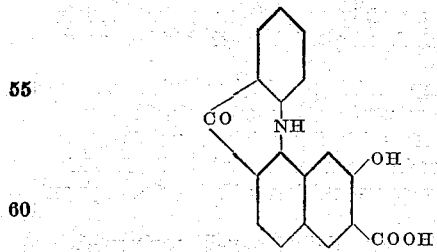

(obtainable, for instance, by heating 8-(2'-carboxy-phenylamino)-1-hydroxy-naphthalene-3-carboxylic acid with concentrated sulfuric acid) are ground with 50 cc. of chlorobenzene for 12 hours in the ball-mill and then introduced into a vessel having a stirrer by rinsing with 300 cc. of chlorobenzene. After addition of 15 grams of aniline, 4 grams of phosphorus trichloride are dropped in at 70° C. The whole is then heated for 4 hours at 135° C., cooled to 70° C., a further 2 grams of phosphorus trichloride are added, and the temperature is maintained for 6 hours at 135° C. After cooling, the anilide is isolated in the manner described in the preceding examples. The product is purified by heating to boiling for a prolonged time with a small quantity of glacial acetic acid, whereby the impurities are dissolved. After cooling, the compound is filtered with suction, washed with water, dissolved in pyridine and precipitated therefrom by means of hot water.

The yellow anilide obtained has properties similar to those of the arylides above mentioned. It melts at 365° C.

7. 32 grams of the sodium salt of 4'-hydroxy-5'-carboxy-3.4-benzoacridone are ground for 12 hours in the ball mill with 100 cc. of chlorobenzene. The whole is introduced into a vessel having a stirrer by rinsing with 400 cc. of chlorobenzene and 20 grams of para-anisidine are added. In the manner described in Example 6 there are first added 8 grams of phosphorus trichloride and then again 4 grams of phosphorus trichloride. The product is further worked up as described in Example 6. The para-anisidide thus obtained is, likewise, a body crystallizing in yellow needles and having properties similar to those of the anilide. It melts at 335° C.

8. 33 grams of the sodium salt of 4'-hydroxy-5'-carboxy-1.2-benzoacridone are ground with 100 cc. of chlorobenzene for 24 hours in the ball mill and the whole is then introduced into a vessel having a stirrer by rinsing with 400 cc. of chlorobenzene. 30 grams of alpha-amino-naphthalene are added. The product is treated with phosphorus trichloride and then further worked up as described in Examples 1 and 3.

After recrystallization from pyridine, the alpha-naphthylamide of 4'-hydroxy-5'-carboxy-1.2-benzoacridone is obtained in the form of long needles melting at 328° C.; it has properties similar to those of the arylides already mentioned.

9. The beta-naphthylamide of 4'-hydroxy-5'-carboxy-1.2-benzoacridone is obtained in the same manner as described in Example 8. The melting point of the arylide obtained is situated at 340° C.

We claim:

1. The compounds of the following general formula:

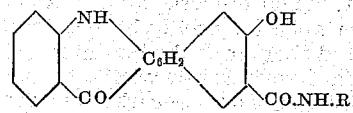

wherein R stands for a member of the group consisting of phenyl, methoxy-phenyl, methyl-methoxy-phenyl and naphthyl, being yellow crystallized compounds which have a high affinity for the vegetable fiber.

2. The compound of the following formula:

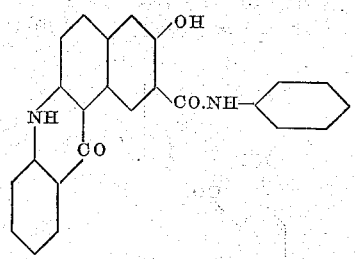

crystallizing from glacial acetic acid or aqueous pyridine in the form of fine yellow needles, which melt at 334° C., and having a high affinity for the vegetable fiber.

3. The compound of the following formula:

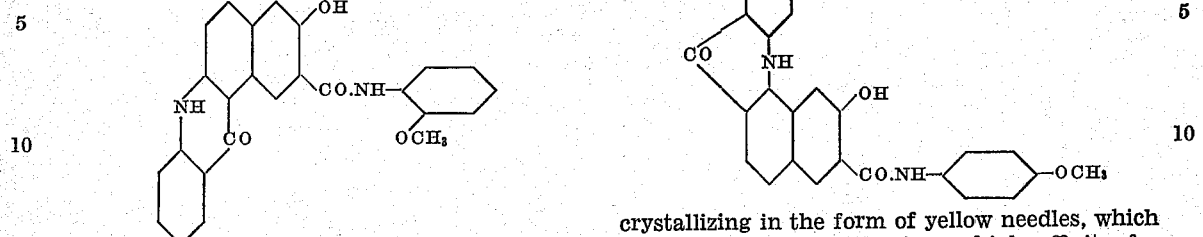

crystallizing in the form of yellow needles, which melt at 299° C., and having a high affinity for the vegetable fiber.

4. The compound of the following formula:

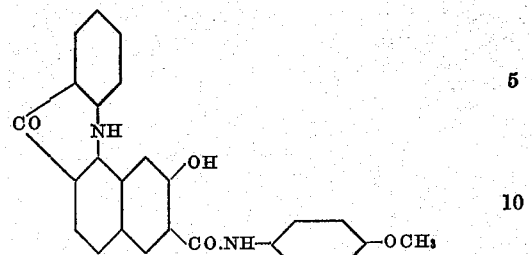

crystallizing in the form of yellow needles, which melt at 335° C., and having a high affinity for the vegetable fiber.

MAX LANGE.
THEODOR JACOBS.